(12) United States Patent
Ma et al.

(10) Patent No.: US 9,507,813 B1
(45) Date of Patent: Nov. 29, 2016

(54) METHOD AND APPARATUS FOR HARDWARE-IMPLEMENTED AVL TREE UPDATES

(71) Applicant: Marvell International Ltd., Hamilton (BM)

(72) Inventors: Tianan Tim Ma, Palo Alto, CA (US); Timothy J. Donovan, Livermore, CA (US)

(73) Assignee: Marvell International Ltd., Hamilton (BM)

( * ) Notice: Subject to any disclaimer, the term of this patent is extended or adjusted under 35 U.S.C. 154(b) by 200 days.

(21) Appl. No.: 14/245,283

(22) Filed: Apr. 4, 2014

Related U.S. Application Data

(60) Provisional application No. 61/810,621, filed on Apr. 10, 2013.

(51) Int. Cl.
*G06F 17/30* (2006.01)

(52) U.S. Cl.
CPC .................. *G06F 17/30327* (2013.01)

(58) Field of Classification Search
CPC .................................. G06F 17/30961
See application file for complete search history.

(56) References Cited

U.S. PATENT DOCUMENTS

| 7,447,698 B2* | 11/2008 | Schopp | G06F 17/30961 707/999.102 |
| 7,539,988 B1* | 5/2009 | Hersh | G06F 9/466 707/999.008 |
| 2002/0087564 A1* | 7/2002 | Khanna | G06F 17/30961 707/999.1 |
| 2010/0268743 A1* | 10/2010 | Hallyal | G06F 17/30961 707/797 |
| 2010/0268904 A1* | 10/2010 | Sheffield | G06F 3/0613 711/163 |

* cited by examiner

*Primary Examiner* — Khanh Pham

(57) ABSTRACT

The present disclosure describes techniques and apparatuses for hardware-implemented AVL tree updates. In some aspects, records are accessed as part of a search performed to update an AVL tree. The update may involve inserting a new node into, or removing a node from, the AVL tree. The AVL tree is represented by records stored in memory, each of which represents a node of the AVL tree. During the search, each of the records accessed is read from memory. The records read from memory are then written to an AVL tree rebalancing component implemented in hardware. Once the records are written to the hardware-implemented AVL tree rebalancer, it can modify, without subsequently accessing the memory, those records corresponding to the nodes affected by the update. After those records are modified by the hardware-implemented AVL tree rebalancer, the modified records are written back to the memory effective to update the AVL tree.

20 Claims, 6 Drawing Sheets

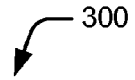

| Data Value | Balance Factor | Pointer to Left Subtree | Pointer to Right Subtree |
|---|---|---|---|
| Data 5 | 2 | Ptr to 3 | Ptr to D |
| Data 3 | -1 | Ptr to A | Ptr to 4 |
| Data A | N/A | NULL | NULL |
| Data 4 | 0 | Ptr to B | Ptr to C |
| Data B | N/A | NULL | NULL |
| Data C | N/A | NULL | NULL |
| Data D | N/A | NULL | NULL |

302

| Data Value | Balance Factor | Pointer to Left Subtree | Pointer to Right Subtree |
|---|---|---|---|
| Data 4 | 0 | Ptr to 3 | Ptr to 5 |
| Data 3 | 0 | Ptr to A | Ptr to B |
| Data A | N/A | NULL | NULL |
| Data B | N/A | NULL | NULL |
| Data 5 | 0 | Ptr to C | Ptr to D |
| Data C | N/A | NULL | NULL |
| Data D | N/A | NULL | NULL |

METHOD AND APPARATUS FOR HARDWARE-IMPLEMENTED AVL TREE UPDATES

CROSS REFERENCE TO RELATED APPLICATION(S)

This present disclosure claims priority under 35 U.S.C. §119(e) to U.S. Provisional Patent Application Ser. No. 61/810,621 filed Apr. 10, 2013, the disclosure of which is incorporated herein by reference in its entirety.

BACKGROUND

Many electronic systems involve the maintenance and storage of vast amounts of information. If the information is not organized for optimum search performance, searching the information to find a particular piece or pieces of information can be unacceptably time consuming. In addition to resulting in sometimes unacceptably long search times, some approaches to organizing information result in unpredictable search times. Thus, when an organizational approach results in unpredictable search times, some pieces of information may be found in a relatively short amount of time, while finding other pieces takes a relatively long amount of time.

To improve search performance, both in terms of search time and predictability, several organizational approaches have been developed. The Adelson-Velskii and Landis' (AVL) tree, for instance, is an approach that results in better search performance for large amounts of information—e.g., in terms of both search time and predictability, than other approaches to organizing information, such as hash tables. Although search performance for information organized using an AVL tree may be better than for information organized using other approaches, conventional techniques to maintain the information as an AVL tree can consume significant computing resources. Consequently, AVL trees may not be used to organize some information even though they could result in better search performance than other organizational approaches.

SUMMARY

This summary is provided to introduce subject matter that is further described below in the Detailed Description and Drawings. Accordingly, this summary should not be considered to describe essential features nor used to limit the scope of the claimed subject matter.

In general, in one aspect, this specification describes a method for accessing records as part of a search performed to update an Adelson-Velskii and Landis' (AVL) tree. The update may involve inserting a new node into the AVL tree or removing one of the nodes of the AVL tree, for example. In any case, the AVL tree is represented by records stored in a memory, each of which represents a node of the AVL tree. During the search, each of the records accessed in association with the search is read from memory. The records that are read from memory are then written to an AVL tree rebalancing component that is implemented in hardware. Once the records have been written to the hardware-implemented AVL tree rebalancing component, it can modify, without subsequently accessing the memory, those records that correspond to the nodes of the AVL tree affected by the update. After those records are modified by the hardware-implemented AVL tree rebalancing component, the modified records are written back to the memory effective to update the AVL tree.

In general, in another aspect, this specification describes a device that includes a memory to store records that each represents a node of an Adelson-Velskii and Landis' (AVL) tree. The device includes an AVL tree rebalancing component that is implemented in hardware. The hardware-implemented AVL tree rebalancing component can modify, without accessing the memory, the records that have been written from the memory to the hardware-implemented AVL tree rebalancing component to implement an update of the AVL tree. The device also includes an AVL tree manager to cause the records stored in the memory to be accessed as part of a search performed in conjunction with the update of the AVL tree. The AVL tree manager causes the records that are accessed during the search to be read from the memory and then written to the hardware-implemented AVL tree rebalancing component. After the records affected by the update are modified by the hardware-implemented AVL tree rebalancing component, the AVL tree manager causes the modified records to be written back to the memory effective to update the AVL tree.

The details of one or more implementations are set forth in the accompanying drawings and the description below. Other features and advantages will be apparent from the description and drawings.

BRIEF DESCRIPTION OF THE DRAWINGS

In the figures, the left-most digit of a reference number identifies the figure in which the reference number first appears. The use of the same reference numbers in different instances in the description and the figures indicate like elements.

FIG. 3 illustrates an example of data records of hardware-implemented AVL tree update techniques that can be updated with a single read from and write to memory in accordance with one or more aspects.

DETAILED DESCRIPTION

Figure 1:
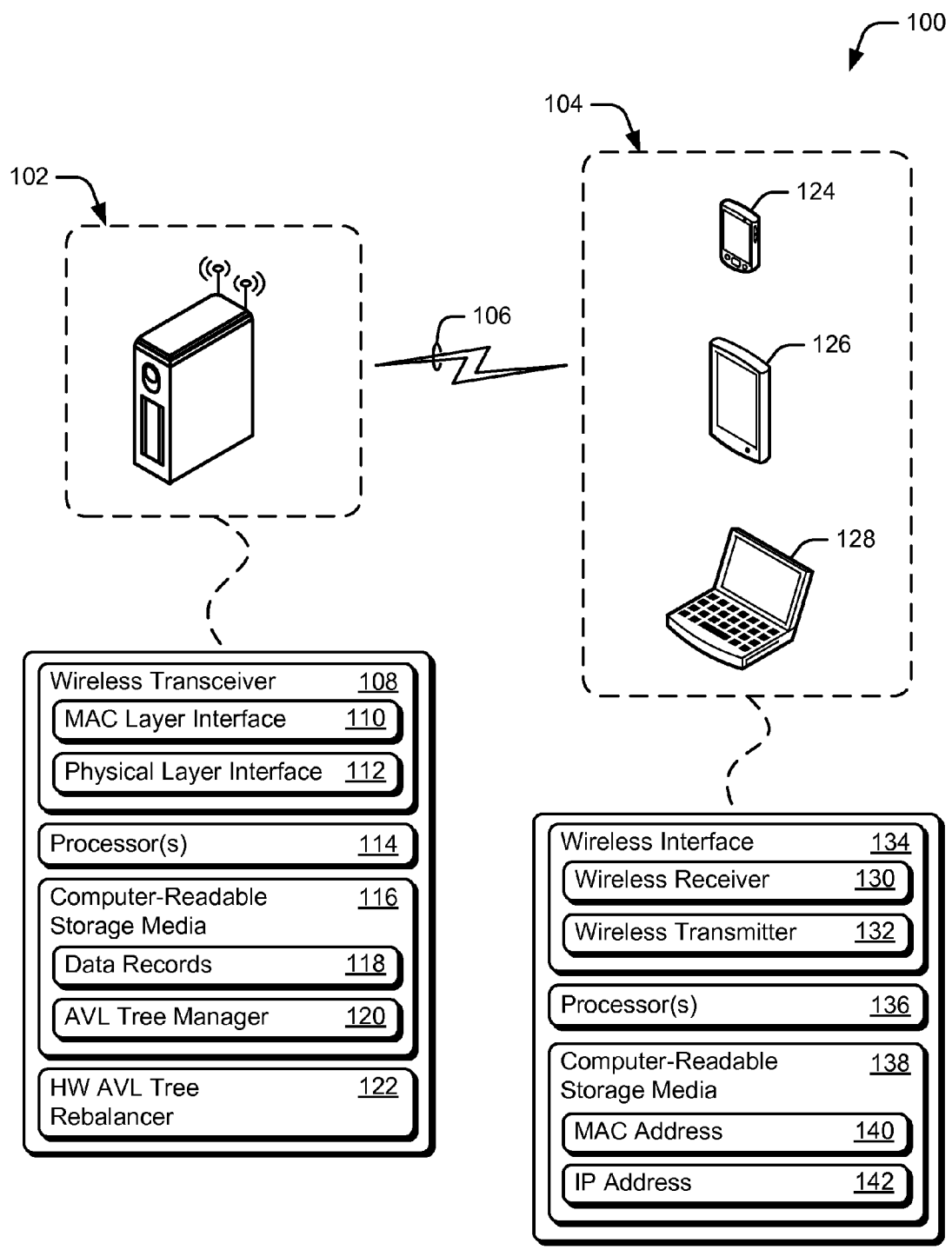
FIG. 1 illustrates an operating environment having an access point to a wireless network and wireless devices capable of communicating with the access point in accordance with one or more aspects.

An Adelson-Velskii and Landis' (AVL) tree is an approach used to organize data. Information maintained according to an AVL tree can result in faster and more predictable search performance than other approaches. Conventional techniques for maintaining information as an AVL tree consume significant computing resources—e.g., central processing unit (CPU) time. Many such techniques to maintain information as an AVL tree are based in software. These techniques can involve a substantial number of sequential memory accesses, the result of which is to slow down the processing speed. In many applications, however, CPU cycles are precious. Thus, using CPU cycles to perform maintenance operations on an AVL tree may be impracticable for such applications. The disclosure describes apparatuses and techniques that maintain information according to an AVL tree in a manner that reduces the burden on a CPU. In particular, this disclosure describes offloading AVL tree operations to dedicated hardware. The apparatuses and techniques described herein utilize the capability of that hardware to process the AVL tree operations in parallel, and enhance the speed of those operations as a result.

Records that are stored in a memory may each represent a node of an AVL tree. At least some of these records may be accessed as part of a search that is performed to update the AVL tree—e.g., to insert additional nodes into the tree or remove an already-existing node from the tree. During the search, the records that are accessed are read from the memory. The records that are read from the memory can then be written to an AVL tree rebalancing component that is implemented in hardware. To do so, an AVL tree manager can cause the records that are read from the memory to be written to the hardware-implemented AVL tree rebalancing component using a single write operation. Alternately, the AVL tree manager can cause the records that are read from the memory to be written to the hardware-implemented AVL tree rebalancing component using a multi-cycle write operation. Once the records are written to the hardware-implemented AVL tree rebalancing component, it can modify those records without subsequently accessing memory. For example, the hardware-implemented AVL tree rebalancing component can modify the records written thereto and that correspond to the nodes of the AVL tree that are affected by the update of the AVL tree. After the hardware-implemented AVL tree rebalancing component modifies the records that correspond to the nodes affected by the update, the modified records can be written back to the memory, updating the AVL tree as a result. To do so, the AVL tree manager can cause the modified records to be written back to memory using a single write operation. Alternately, the AVL tree manager can cause the modified records to be written back to memory using a multi-cycle write operation.

The following discussion describes an operating environment, techniques that may be employed in the operating environment, and a System-on-Chip (SoC) in which components of the operating environment can be embodied. In the discussion below, reference is made to the operating environment by way of example only.

Operating Environment

FIG. 1 illustrates an example operating environment 100 having a wireless access point 102 (access point 102) and wireless devices 104, each of which are wireless-network-enabled and capable of communicating data, packets, and/or frames over communication link 106. Communication link 106 may be any suitable type of wireless communication link. For example, communication link 106 may be implemented in whole or part as a wireless local-area-network (WLAN), ad-hoc WLAN, infrastructure WLAN, wireless mesh network, wireless personal-area-network (WPAN), wireless wide-area-network (WWAN), or short-range wireless network. Communication link 106 may also implement various peer-to-peer communication protocols such as wireless fidelity (WiFi) direct link or a peer-link.

Access point 102 enables wireless devices 104 to communicate over a wireless network connection by, in part, identifying the wireless devices 104. To do so, the access point 102 can extract, from packets sent by the wireless devices 104, identification information that identifies a particular wireless device that sent the information. Using this information, the access point 102 can search for a record associated with the particular wireless device and that enables the access point 102 to communicate with the particular wireless device. Various configurations of access point 102 are contemplated such as a wireless router, a combined wireless router and modem, a desktop computer, server, laptop computer, personal computer (PC), mobile-internet device (MID), gaming console, internet-enabled televisions, "smart" appliances, and so on.

Access point 102 includes a wireless transceiver 108 that provides a wireless interface to handle various communication protocols, such as IEEE 802.11, Bluetooth™, and others mentioned above and elsewhere herein. Wireless transceiver 108 may be configured to implement any suitable type of wireless interface, such as a WLAN, cellular, or Bluetooth™ interface, or a combination thereof. Alternately or additionally, wireless transceiver 108 may be further configured to operate in one or more communication modes, such as infrastructure, peer-to-peer, mesh, peer-link, and the like.

Although shown as a single transceiver, wireless transceiver 108 may be implemented as a separate transmitter and receiver (not shown), and may be hardware combined with or separate from firmware or software. Wireless transceiver 108 communicates data via a media access control (MAC) layer interface 110 and a physical (PHY) layer interface 112, either of which may be hardware combined with or separate from firmware or software. Data of access point 102 is packetized, framed, and/or addressed for communication via MAC layer interface 110. The packetized or framed data is then transmitted over a wireless medium by PHY layer interface 112.

Access point 102 is shown including processor(s) 114 and computer-readable storage media 116 (CRM 116). Processor 114 may be a single core or multiple core processor composed of a variety of materials, such as silicon, polysilicon, high-K dielectric, copper, and so on. CRM 116 may include any suitable memory or storage device, such as random-access memory (RAM), static RAM (SRAM), dynamic RAM (DRAM), non-volatile RAM (NVRAM), read-only memory (ROM), or Flash memory useful to store device data (e.g., data records 118 associated with wireless devices 104). The data records 118 can be associated with a respective wireless device 104 and enable the access point 102 to communicate with the respective wireless device 104. Further, data records 118 can be maintained as an AVL tree. In this way, the access point 102 can search for a data record 118 that is associated with a particular wireless device 104 using an AVL tree search.

References are made herein to AVL tree updates, AVL tree rebalancing, AVL tree search, and maintaining information as an AVL tree (structure). Although AVL trees are well-known to those skilled in the art, a brief overview of AVL trees is included herein to assist the reader. An Adelson-Velskii and Landis' (AVL) tree, named after the inventors, is a self-balancing binary search tree. In an AVL tree, the heights of two child subtrees of any node differ by at most one level. If the difference in height between the two child subtrees of a node differs by more than one level—e.g., as a result of node insertion or deletion, the tree is rebalanced to restore that property. By maintaining this balance, searching for a particular node, inserting a particular node, and deleting a particular node each take O(log n) time in both the average and worst cases, where n is the number of nodes in the tree prior to the operation.

Figure 2:
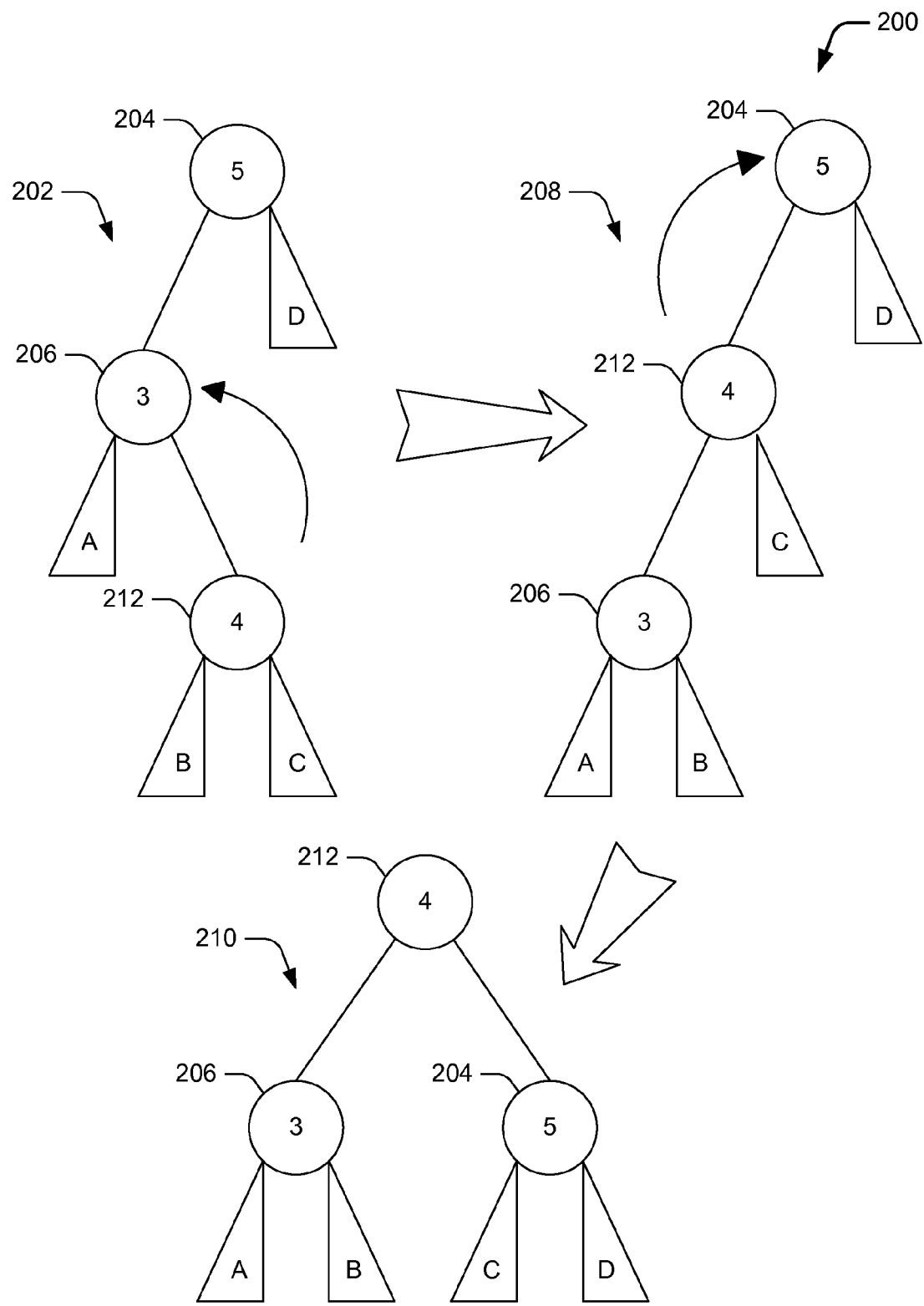
FIG. 2 illustrates an example AVL tree of hardware-implemented AVL tree update techniques that is rebalanced in accordance with one or more aspects.

FIG. 2 illustrates an example AVL tree of hardware-implemented AVL tree update techniques that is rebalanced in accordance with one or more aspects at 200. When nodes are inserted into or deleted from an AVL tree, one or more tree rotations may be performed to rebalance the tree.

When a node is inserted into an AVL tree, for instance, each ancestor of the inserted node is checked for consistency with the "rules" of AVL trees—e.g., that the heights of two child subtrees of any node differ by at most one level. To ensure compliance with these rules, a balance factor is calculated for each node that is checked. If the balance factor calculated for a node is equal to negative one (−1), zero (0), or positive one (1), then no rotations are initiated based on that node. If the balance factor calculated for a node is less than negative one (−1) or greater than positive one (+1), however, the subtree rooted at that node is considered to be unbalanced. In accordance with AVL tree techniques, the balance factor for a node i is calculated as follows:

BalanceFactor($i$)=height(left subtree($i$))−height(right subtree($i$))

Alternately, the balance factor for a node i can be calculated as follows:

BalanceFactor($i$)=height(right subtree($i$))−height(left subtree($i$))

Still further, the balance factor for a node i can be calculated as follows:

BalanceFactor($i$)=|height(left subtree($i$))−height(right subtree($i$))|

When the balance factor indicates that a subtree rooted at a node is unbalanced, the tree is rebalanced by performing one or more tree rotations. Generally, the AVL tree at 200 illustrates one such rotation.

At 202, the AVL tree is illustrated having a "left-right" configuration. This configuration of the AVL tree may result from node insertion. In the configuration illustrated at 202, node 204 corresponds to a record having a data value of five (5), and a balance factor of two (2). This balance factor indicates that the subtrees of node 204 are unbalanced such that the height of the left subtree of node 204 is greater than that of the right subtree of node 204. The left subtree of node 204, which is rooted at node 206 (which has a value of three (3)), is then considered. If the left subtree rooted at node 206 does not lean to the right, as is the case at 208 (a "left-left" configuration), then the AVL tree can be balanced simply by performing a rotation to the right to result in the "balanced" configuration illustrated at 210. In the configuration illustrated at 210, the AVL tree has been rotated such that node 212, which has a value of four (4), becomes the root node, and such that node 212 has a left subtree rooted at node 206 and a right subtree rooted at node 204.

It can be determined that the left subtree rooted at node 206 does not lean to the right given the balance factor of node 206. A balance factor of zero (0) or one (1) indicates that the left subtree does not lean to the right. If the left subtree rooted at node 206 leans to the right, as is the case at 202, that subtree is first rotated to the left to result in the left-left configuration illustrated at 208. It can be determined that the left subtree rooted at node 206 leans to the right given the balance factor of node 206. A balance factor of negative one (−1) indicates that the left subtree leans to the right. Once the rotation is performed to result in the left-left configuration illustrated at 208, the AVL tree can then be balanced by performing a rotation to the right to result in the balanced configuration illustrated at 210.

The rotation to rebalance the AVL tree illustrated in FIG. 2 and described just above should not be considered to limit the scope of AVL operations that may be performed in accordance with hardware-implemented AVL tree update techniques. For example, rotating an AVL tree having a right-left configuration to a right-right configuration, and then to a balanced configuration is contemplated within the scope of the techniques described herein. Other rotations and operations performed in accordance with the rules of AVL trees are also to be considered within the scope of the techniques described herein.

FIG. 3 illustrates an example of data records for hardware-implemented AVL tree update techniques that can be updated with a single read from and write to memory in accordance with one or more aspects at 300. Alternately, the data records can be updated with a multiple-cycle read from and write to memory (e.g., a burst operation). The data records at 300 may correspond to at least some of the data records 118 at the access point 102. In any case, the data records illustrated at 300 can be maintained in a memory as an AVL tree. Each data record may include elements such as a data value, a balance factor, a pointer to a left subtree, and a pointer to a right subtree. Each data record may contain additional elements without departing from the scope of the techniques described herein.

Continuing with the example above, in which the data records each correspond to a wireless device, the data value of a particular record may correspond to the identifying information that identifies a particular wireless device. Thus, the identifying information of wireless devices known to the access point 102 may be organized according to an AVL tree. In this way, a data record corresponding to a particular wireless device may be found using an AVL tree search of the data records. Once the data record is found, other information associated with the wireless device and that enables communication with the access point 102 may then be accessed. Due to the speed with which an AVL tree search is capable of finding a record (and thus accessing other associated information), communication protocols that utilize data maintained as an AVL tree may be capable of greater throughput than conventional protocols that are limited by the speed with which a record for a wireless device can be found.

Returning to the discussion of the data records at 300, the data records may represent nodes of the AVL tree illustrated in FIG. 2. The data records at 302, for example, may correspond to the left-right configuration of the AVL tree illustrated at 202. Each of the data records at 302 may represent a node of the AVL tree illustrated at 202. The data records at 304, however, may correspond to the balanced configuration of the AVL tree illustrated at 210. Each of the data records at 304 may represent a node of the AVL tree illustrated at 210. The records at 304 may have been updated to reflect the rotation to rebalance the AVL tree that is illustrated in FIG. 2.

With reference again to the discussion of FIG. 1, AVL tree manager 120 may be employed to manage the updating of data records that are stored as an AVL tree. In one implementation, AVL tree manager 120 can be embodied on CRM 116 (as shown). Alternately or additionally, AVL tree manager 120 may be implemented in whole or part as hardware logic or circuitry integrated with or separate from other components of access point 102 (e.g., wireless transceiver 108). In aspects, the AVL tree manager 120 manages one or more AVL tree operations for the hardware-implemented AVL tree update techniques.

Access point 102 is also shown including a hardware-implemented AVL tree rebalancing component 122 (HW AVL tree rebalancer 122). Although AVL tree manager 120 and HW AVL tree rebalancer 122 are illustrated as part of an access point 102 for wireless communication, it should be appreciated that use of these components for other applications is well within the scope of the techniques described herein. For example, AVL tree manager 120 and HW AVL tree rebalancer 122 can be used in conjunction with applications that manage requests for a limited resource or resources—e.g., an application that manages high volumes of callers and/or internet requests for tickets to an event, in which calls and internet requests can be added as placed, can be dropped as satisfied or due to error, and can be given an order with which the application is to initiate a response to the calls and requests. Still, use in conjunction with managing requests for a resource is simply one other example in which the AVL tree manager 120 and HW AVL tree rebalancer 122 can be used. The AVL tree manager 120 and HW AVL tree rebalancer 122 can be used for other applications that are not described herein without departing from the scope of the described techniques.

Regardless of the application for which the AVL tree manager 120 and HW AVL tree rebalancer 122 are used, the AVL tree manager 120 and HW AVL tree rebalancer 122 are configured to maintain and search through information organized as an AVL tree. The AVL tree manager 120 can perform an AVL tree search for a particular record through the data records 118 that are organized as the AVL tree. For example, the AVL tree manager 120 can perform the AVL tree search simply to locate a particular data record and access the information associated thereto.

The AVL tree manager 120 can also perform the AVL tree search as part of a search to update the AVL tree. The AVL tree search may be performed to determine where in the AVL tree one or more new nodes are to be inserted, for example. In the context of FIG. 1, new nodes may be inserted when a wireless device 104 sends a packet to the access point 102 to initiate communication therewith, and when the access point 102 does not yet have a record for the wireless device 104.

Further, the AVL tree search may be performed to locate a node in the AVL tree for deletion. To delete a node, the AVL tree manager 120 may access nodes in addition to those accessed as part of a conventional AVL tree search. The AVL tree manager 120 can access the additional nodes as part of a search to delete a node in two cases. In both cases, a parent node of the node being deleted has both a left and a right subtree. In the first case, the node being deleted is a left subtree node of the parent node. In this first case, the AVL tree manager 120 also accesses the right subtree node of the parent node (right child node), and the left subtree node of the right child node. In the second case, the node being deleted is the right subtree node of the parent node. In this second case, the AVL tree manager 120 also accesses the left subtree node of the parent node (left child node), and the right subtree node of the left child node.

Although the AVL tree manager 120 may perform a search to determine where in an AVL tree one or more new nodes are to be inserted or to locate a node in the AVL tree for deletion, the AVL tree does not perform the AVL tree operations attendant to an update—e.g., rotations that rebalance the AVL tree. Instead, the AVL tree operations that are performed in conjunction with an AVL tree update, other than search of the AVL tree, are performed by the HW AVL tree rebalancer 122.

The HW AVL tree rebalancer 122 can modify records that are written thereto to rebalance the corresponding AVL tree. In particular, the HW AVL tree rebalancer 122 can modify each of the records written thereto, and that are affected by an update, in parallel and without accessing memory. Such parallel modification results in maintenance operations being performed in less time than if such modifications were performed sequentially. By modifying those records without accessing memory, the HW AVL tree rebalancer 122 allows computing resources to be used for other tasks. Cycles of a central processing unit (CPU), for instance, need not be spent accessing each record of the AVL tree for each AVL tree rotation involved in an update. Rather, the HW AVL tree rebalancer 122 enables the records to be read from memory with a single read operation. Alternately, the data records can be read from memory with a multiple-cycle read operation (e.g., a burst operation). After the records affected by an update are modified by the HW AVL tree rebalancer 122, the modified records can then be written back to the memory with a single write operation, or alternately a burst operation.

In addition to searching the data records representing the nodes of the AVL tree, the AVL tree manager 120 can cause a subset of those to be read from memory and written to the HW AVL tree rebalancer 122. To update an AVL tree, the AVL tree manager 120 causes a record representing each node that is searched as part of the update to be read from memory and written to the HW AVL tree rebalancer 122. The AVL tree manager 120 may search a subset of the records to determine where in the AVL tree a new node is to be inserted, for example. That subset of records accessed as part of the search to implement the insertion is then written to the HW AVL tree rebalancer 122. In a similar manner, the AVL tree manager 120 may search a subset of records to locate a particular node for deletion from the AVL tree. Those records that are accessed as part of the search to implement the deletion are then written to the HW AVL tree rebalancer 122.

The AVL tree manager 120 can also cause those records that are modified by the HW AVL tree rebalancer 122 to be written back to the memory. The HW AVL tree rebalancer 122 can modify the balance factor and subtree pointers of records written thereto to rebalance an AVL tree in accordance with AVL tree rebalancing techniques. AVL tree rebalancing techniques may not result in each of the records written to the HW AVL tree rebalancer 122 to be modified for an update, however. Rather the modification may be limited to a subset of the records written to the HW AVL tree rebalancer 122. The AVL tree manager 120 can cause solely those records that have been modified by the HW AVL tree rebalancer 122 to be written back to memory. When the AVL tree manager 120 writes the records back to the memory it is effective to update the AVL tree.

As discussed briefly above, each of the data records 118 maintained in an AVL tree arrangement can correspond to a particular wireless device. Wireless devices 104 are shown including mobile device 124, tablet device 126, and laptop computing device 128. Accordingly, the mobile device 124, tablet device 126, and laptop computing device 128 can each correspond to a data record at the access point 102 that is maintained as part of an AVL tree. Each of wireless devices 104 includes a wireless receiver 130 and a wireless transmitter 132 for providing a wireless interface 134 to communicate via various protocols or wireless networks, such as IEEE 802.11 or Bluetooth™. Wireless devices 104 operate in one or more communication modes, such as infrastructure, peer-to-peer, mesh, peer-link, and the like. Wireless receiver 130 and wireless transmitter 132 may be separate (shown) or combined (not shown) and may be hardware combined with or separate from firmware or software.

Wireless devices 104 are also illustrated as including processor(s) 136, computer-readable storage media 138 (device CRM 138). Wireless devices 104 are also illustrated as including MAC address 140 and Internet Protocol (IP) Address 142, which, in one implementation, are embodied on device CRM 138. MAC address 140 and IP address 142 may correspond to the identification information that access point 102 extracts from packets to identify the wireless devices 104. Additionally or alternately, the MAC address 140 and IP address 142 can be included in data records 118 associated with the wireless devices 104. The device CRM 138 may include any suitable memory or storage device, such as random-access memory (RAM), read-only memory (ROM), or Flash memory useful to store identifying information of the wireless device 104 or other applications and/or firmware of the wireless device 104.

Techniques for Hardware-Implemented AVL Tree Updates

The following discussion describes techniques for hardware-implemented AVL tree updates. These techniques can be implemented using the previously described environments or entities, such as AVL tree manager 120 and HW AVL tree rebalancer 122 of FIG. 1 embodied on access point 102. These techniques include methods illustrated in FIGS. 4 and 5, each of which is shown as a set of operations performed by one or more entities. These methods are not necessarily limited to the orders shown for performing the operations. Further, these methods may be used in conjunction with one another, in whole or in part, whether performed by the same entity, separate entities, or any combination thereof. In portions of the following discussion, reference will be made to operating environment 100 of FIG. 1 by way of example. Such reference is not to be taken as limited to operating environment 100 but rather as illustrative of one of a variety of examples.

Figure 4:
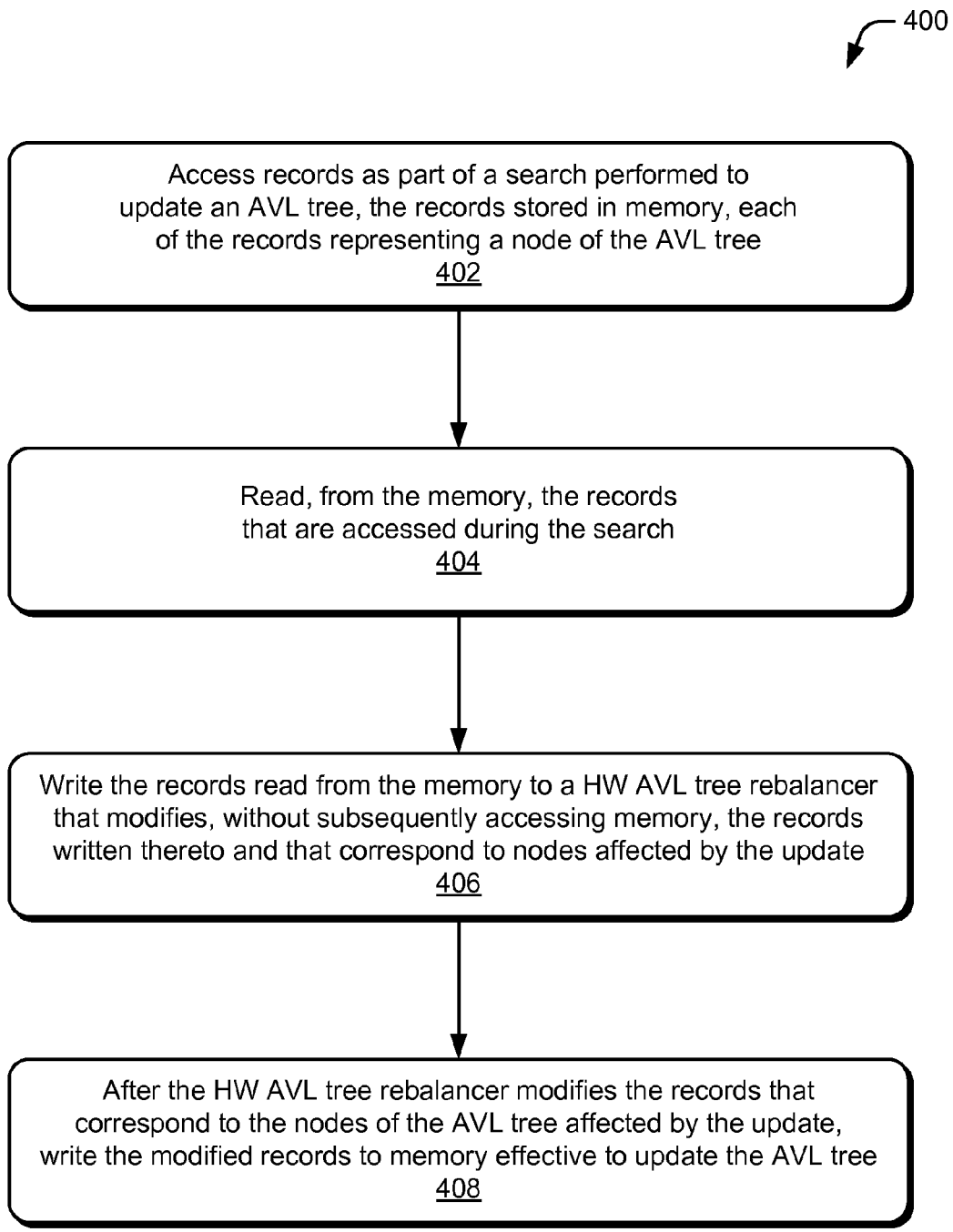
FIG. 4 illustrates a method for updating records organized according to an AVL tree using a hardware-implemented AVL tree rebalancing component rather than updating those records using a software implementation.

FIG. 4 depicts a method 400 for updating records organized according to an AVL tree using a hardware-implemented AVL tree rebalancing component rather than updating those records using a software implementation.

At 402, one or more records are accessed as part of a search performed to update an AVL tree. The records are stored in a memory and each record represents a node of the AVL tree that is being updated. In the context of operating environment 100, at least some of the data records 118 are maintained in memory as an AVL tree. Each of the data records 118 maintained according to the AVL tree represents a node of the AVL tree. The AVL tree manager 120 performs an AVL search of the data records 118 that represent the nodes of the AVL tree to locate one or more of the records, such as to update the AVL tree. The AVL tree can be updated to insert additional nodes, and thereby add additional records to the data records 118. Alternately, the AVL tree can be updated to remove existing nodes, and thereby remove records from the data records 118. As discussed in more detail above, the AVL tree manager 120, when deleting records representative of some nodes from the AVL tree, accesses nodes in addition to those accessed according to a conventional AVL tree search.

At 404, the records that are accessed during the search are read from the memory. In the context of operating environment 100, the AVL tree manager 120 causes data records to be read from the memory that are maintained as part of the AVL tree and accessed during the search to update the AVL tree. The AVL tree manager 120 causes those data records to be read from the memory using a single read operation. Alternately, AVL tree manager 120 causes those data records to be read from memory with a multiple-cycle read operation.

At 406, the records that are read from the memory are written to a hardware-implemented AVL tree rebalancing component. The hardware-implemented AVL tree rebalancing component is configured to modify, without subsequently accessing the memory, the records that have been written thereto and that correspond to the nodes of the AVL tree that are affected by the update of the AVL tree. In the context of operating environment 100, the AVL tree manager 120 causes the records that are read from memory in act 404 to be written to the HW AVL tree rebalancer 122. The AVL tree manager 120 can cause the records read from memory in act 404 to be written to a stack of the HW AVL tree rebalancer 122, for example.

Once the records read from memory in act 404 are written to the HW AVL tree rebalancer 122, the HW AVL tree rebalancer 122 modifies the records according to the "rules" of AVL without accessing the memory. Specifically, the HW AVL tree rebalancer 122 modifies the records written thereto so that the AVL tree is "balanced" according to the rules of AVL trees, which are discussed in more detail above. To do so, the HW AVL tree rebalancer 122 without accessing memory can modify each of a balance factor of a record, a left subtree pointer of the record, or a right subtree pointer of the record. Further, the HW AVL tree rebalancer 122 may modify just a subset of the records that were written thereto in act 404. The records modified by the HW AVL tree rebalancer 122 are those for which at least one of the balance factor, the left subtree pointer, or the right subtree pointer is to change. Some of the records written to the HW AVL tree rebalancer 122 in act 404 may not be modified, such as those records that were checked as part of the search to update the AVL tree, but are not affected by a rebalancing of the AVL tree. In contrast to conventional techniques, the HW AVL tree rebalancer 122 modifies each of the records written thereto and that are affected by the update in parallel. Modifying the affected records in parallel enables maintenance operations on the AVL tree to be performed tree faster than if the records were modified serially.

At 408, after the hardware-implemented AVL tree rebalancing component modifies the records that correspond to the nodes of the AVL tree affected by the update, the modified records are written to the memory effective to update the AVL tree. In the context of operating environment 100, the AVL tree manager 120 causes the records modified by the HW AVL tree rebalancer 122 to be written back to the memory. The AVL tree manager 120 can limit the records written back to the memory to those modified by the HW AVL tree rebalancer 122. In doing so, the AVL tree manager 120 causes the modified records to be written back to memory using a single write operation. Alternately, AVL tree manager 120 causes the modified records to be written back to memory with a multiple-cycle write operation. Given that the HW AVL tree rebalancer 122 does not access memory while modifying records, the records maintained in memory are not updated until written back. In this way, the writing back is effective to update the records in memory and thus the AVL tree represented by those records.

Figure 5:
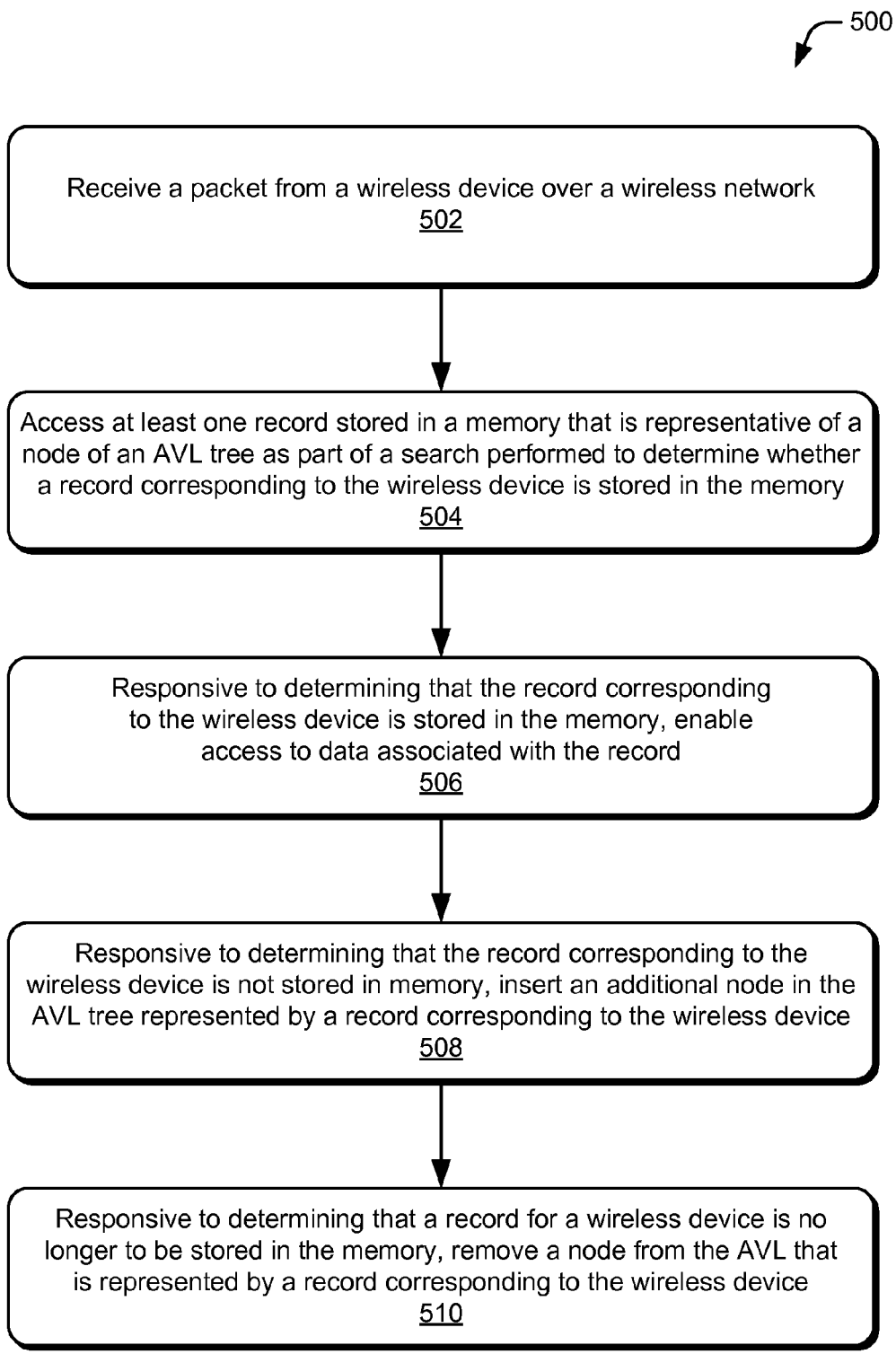
FIG. 5 illustrates a method for establishing a wireless connection between a wireless device and an access point that involves searching records that are organized according to an AVL tree, the organization of which is maintained using a hardware-implemented AVL tree rebalancing component.

FIG. 5 depicts a method 500 for establishing a wireless connection between a wireless device and an access point that involves searching records that are organized according to an AVL tree, the organization of which is maintained using a hardware-implemented AVL tree rebalancing component.

At 502, a packet is received from a wireless device over a wireless network. In the context of operating environment 100, access point 102 receives a packet over communication link 106 from a wireless device 104.

At 504, at least one record that represents a node of an AVL tree is accessed from memory as part of a search performed to determine whether a record corresponding to the wireless device is stored in memory. In the context of operating environment 100, the AVL tree manager 120 causes an AVL tree search to be performed through data records 118 that are maintained as an AVL tree to locate a record for wireless device 104. The packet received from the wireless device 104 can include identifying information. Further, the data records 118 that are maintained as the AVL tree can each correspond to a particular wireless device that is associated with unique identifying information. Further, the data records maintained as the AVL tree can be arranged in the AVL tree using to the identifying information. Accordingly, the AVL tree manager 120 can use the identifying information extracted from the received packet to search for the wireless device 104.

At 506, responsive to determining that a record corresponding to the wireless device is stored in memory, data associated with the record is accessed. In the context of operating environment 100, an AVL tree search performed by the AVL tree manager 120 locates a record of the wireless device 104 among the data records 118 maintained as the AVL tree. The record located by the AVL tree search can provide access to additional information about the wireless device. For example, the record located by the AVL tree search may provide a pointer to the additional information or an address of the additional information. By providing access to this additional information, the record can be considered associated with the additional information. In an environment in which hardware-implemented AVL tree techniques are utilized by an access point for wireless communication, the additional data can correspond to channel data of a wireless device, manufacturer data, firmware data, authentication information, authorization information, and other data that may be used to communicate with the wireless device 104.

At 508, responsive to determining that a record corresponding to the wireless device is not stored in the memory, an additional node that is represented by a record corresponding to the wireless device is inserted in the AVL tree. In the context of operating environment 100, an AVL tree search performed by the AVL tree manager 120 does not locate a record corresponding to the wireless device 104. Consequently, a new record that corresponds to the wireless device 104 may be added to the data records 118 maintained as the AVL tree.

Although the AVL tree search performed by the AVL tree manager 120 does not locate a record corresponding to the wireless device 104, that search nevertheless is effective to locate where in the AVL tree a node corresponding to the wireless device 104 is to be inserted. Accordingly, the AVL tree manager 120 causes the records checked during the AVL tree search to be read from memory and committed to the HW AVL tree rebalancer 122. The AVL tree manager 120 also causes a record corresponding to the new node to be committed to the HW AVL tree rebalancer 122. Once the records are written to the HW AVL tree rebalancer 122, the HW AVL tree rebalancer 122 modifies the records according to the rules of AVL trees. The AVL tree manager 120 then causes the modified records to be written back to the memory, which is effective to include the new record as part of the AVL tree structure.

At 510, responsive to determining that a record for a wireless device is no longer to be stored in the memory, a node that is represented by a record corresponding to the wireless device is removed from the AVL tree. In the context of operating environment 100, a module (not shown) of the access point 102 can determine that a record for a wireless device is no longer to be stored with the data records 118 that are maintained as an AVL tree. This module may make such a determination, for example, if an IP address of the wireless device is expired. In any case, the record corresponding to the wireless device can be removed. To do so, the AVL tree manager 120 causes an AVL tree search to be performed to locate a record corresponding to the wireless device from among the data records maintained as an AVL tree. As described in more detail above, the AVL tree manager 120 may, in some cases, cause additional nodes of the AVL tree to be accessed to implement a deletion. The AVL tree manager 120 also causes the records that were accessed during the search to be read from the memory and written to the HW AVL tree rebalancer 122. The record corresponding to the wireless device can then be deleted from memory. The HW AVL tree rebalancer 122 then modifies the records according to the rules of AVL trees.

System-on-Chip

Figure 6:
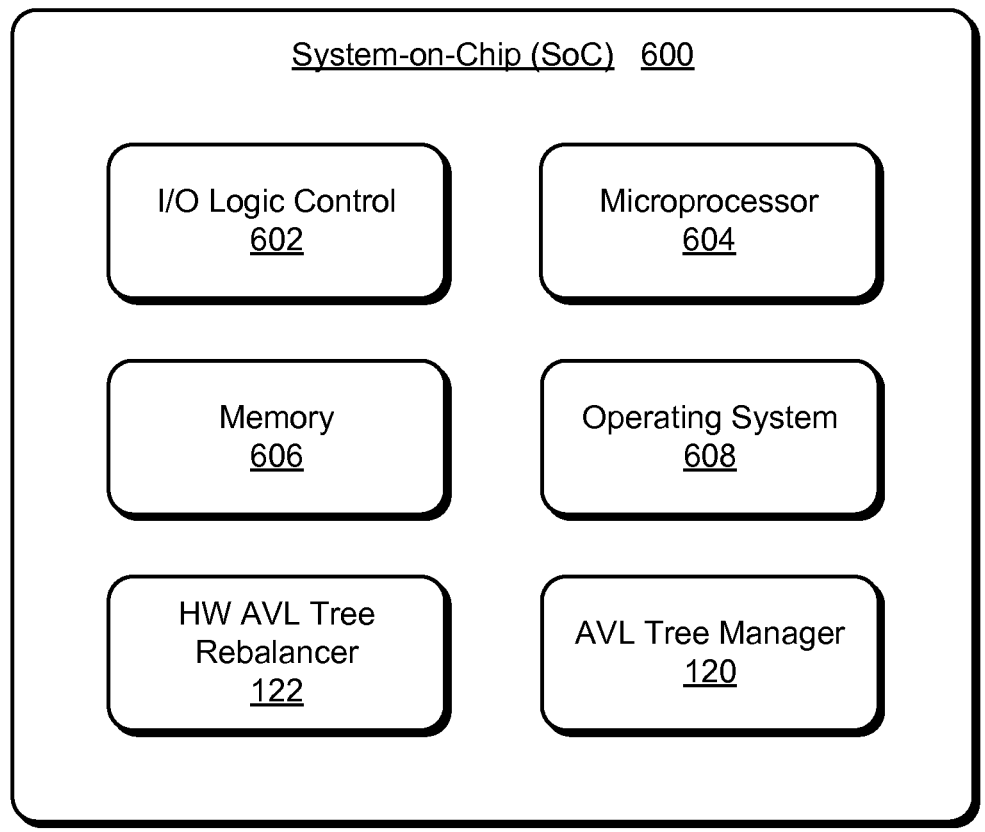
FIG. 6 illustrates a System-on-Chip (SoC) environment for implementing aspects of the techniques described herein.

FIG. 6 illustrates a System-on-Chip (SoC) 600, which can implement various aspects of hardware-implemented AVL tree update techniques as described above. A SoC can be implemented in any suitable device, such as a network access point, and/or any other type of electronic system configured to maintain information in a table that is to be searched.

SoC 600 can be integrated with electronic circuitry, a microprocessor, memory, input-output (I/O) logic control, communication interfaces and components, other hardware, firmware, and/or software needed to provide communicative coupling for a device, such as any of the above-listed devices. SoC 600 can also include an integrated data bus or crossbar (not shown) that couples the various components of the SoC for data communication between the components. A wired or wireless communication device that includes SoC 600 can also be implemented with many combinations of differing components. In some cases, these differing components may be configured to implement concepts described herein over various types of wireless connections.

In this example, SoC 600 includes various components such as an input-output (I/O) logic control 602 (e.g., to include electronic circuitry) and a microprocessor 604 (e.g., any of a microcontroller or digital signal processor). SoC 600 also includes a memory 606, which can be any type of RAM, low-latency nonvolatile memory (e.g., Flash memory), ROM, and/or other suitable electronic data storage. SoC 600 can also include various firmware and/or software, such as an operating system 608, which can be computer-executable instructions maintained by memory 606 and executed by microprocessor 604. SoC 600 can also include other various communication interfaces and components, communication components, other hardware, firmware, and/or software.

SoC 600 includes HW AVL tree rebalancer 122 and AVL tree manager 120 (embodied as disparate or combined components as noted above). Examples of these various components, functions, and/or entities, and their corresponding functionality, are described with reference to the respective components of the environment 100 shown in FIG. 1.

AVL tree manager 120, either independently or in combination with other entities, can be implemented as computer-executable instructions maintained by memory 606 and executed by microprocessor 604 to implement various embodiments and/or features described herein. AVL tree manager 120 may also be provided integral with other entities of the SoC, such as integrated with one or both of I/O logic controller 602 or any wireless interface within, or associated with, SoC 600. Alternatively or additionally, AVL tree manager 120 and the other components can be implemented as hardware, firmware, fixed logic circuitry, or any combination thereof that is implemented in connection with the I/O logic control 602 and/or other signal processing and control circuits of SoC 600.

Although the subject matter has been described in language specific to structural features and/or methodological operations, it is to be understood that the subject matter defined in the appended claims is not necessarily limited to the specific features or operations described above, including orders in which they are performed.

What is claimed is:

1. A method comprising:
   accessing one or more records as part of a search performed to update an Adelson-Velskii and Landis' (AVL) tree, the records stored in a memory, each of the records representing a node of the AVL tree;
   reading, from the memory, the one or more records that are accessed during the search;
   writing the one or more records that are read from the memory to a hardware-implemented AVL tree rebalancing component;
   utilizing the hardware-implemented AVL tree rebalancing component to modify, based on rules for balancing AVL trees and without accessing the memory, the one or more records that correspond to the nodes of the AVL tree affected by the update of the AVL tree; and
   after the hardware-implemented AVL tree rebalancing component modifies the records that correspond to the nodes of the AVL tree affected by the update, writing the modified records to the memory effective to update the AVL tree.

2. The method of claim 1, wherein the update of the AVL tree involves one of inserting one or more additional nodes into the AVL tree or removing at least one of the nodes of the AVL tree.

3. The method of claim 2, wherein inserting the one or more additional nodes into the AVL tree includes writing one or more additional records corresponding to the inserted nodes to the memory.

4. The method of claim 2, wherein removing the at least one node of the AVL tree includes deleting at least one record corresponding to the at least one node from the memory.

5. The method of claim 1, wherein the hardware-implemented AVL tree rebalancing component is configured to modify the records that correspond to the nodes of the AVL tree that are affected by the update of the AVL tree in parallel, one said record to another.

6. The method of claim 1, wherein the records representing the nodes of the AVL tree are searchable according to an AVL tree search technique to locate a particular said record.

7. The method of claim 1, further comprising:
   receiving a packet from a wireless device over a wireless network;
   accessing at least one of the records representing the nodes of the AVL tree as part of a search performed according to an AVL tree search technique to determine whether a record associated with the wireless device is stored in the memory,
   responsive to determining that a record associated with the wireless device is stored in the memory, enabling access to data associated with said record; and
   responsive to determining that a record associated with the wireless device is not stored in the memory:
      writing a new record associated with the wireless device to the hardware-implemented AVL tree rebalancing component;
      utilizing the hardware-implemented AVL tree rebalancing component to modify the new record based on rules for inserting new nodes into AVL trees and without accessing the memory; and
      after the hardware-implemented AVL tree rebalancing component modifies the new record, writing the modified new record to the memory effective to insert a new node into the AVL tree that corresponds to the wireless device.

8. The method of claim 7, wherein the data associated with said record is usable to form a wireless network connection between the wireless device and a wireless access point.

9. A device comprising:
   a memory configured to store records that each represents a node of an Adelson-Velskii and Landis' (AVL) tree;
   a hardware-implemented AVL tree rebalancing component configured to modify, without accessing the memory and based on rules for balancing AVL trees, the records that have been written to the hardware-implemented AVL tree rebalancing component from the memory prior to modification and that correspond to the nodes of the AVL tree affected by an update of the AVL tree; and
   an AVL tree manager configured to:
   cause one or more of the records stored in the memory to be accessed as part of a search performed in conjunction with the update of the AVL tree;
   cause the one or more records that are accessed during the search to be read from the memory;
   cause the records that are read from the memory to be written to the hardware-implemented AVL tree rebalancing component; and
   after the hardware-implemented AVL tree rebalancing component modifies the records that correspond to the nodes of the AVL tree affected by the update, cause the modified records to be written to the memory effective to update the AVL tree.

10. The device of claim 9, wherein the update of the AVL tree involves one of inserting one or more additional nodes into the AVL tree or removing at least one of the nodes of the AVL tree.

11. The device of claim 10, wherein the AVL tree manager is further configured to cause one or more additional records corresponding to the one or more additional nodes to be written to the memory effective to insert the one or more additional nodes into the AVL tree.

12. The device of claim 10, wherein the AVL tree manager is further configured to cause at least one of the records corresponding to the at least one node to be deleted from the memory effective to remove the at least one node from the AVL tree.

13. The device of claim 9, wherein the hardware-implemented AVL tree rebalancing component is further configured to modify the records that correspond to the nodes of the AVL tree affected by the update of the AVL tree in parallel, one said record to another.

14. The device of claim 9, wherein the AVL tree manager is further configured to search the records representing the nodes of the AVL tree according to an AVL tree search technique to locate a particular said record.

15. One or more computer-readable memory devices embodying processor-executable instructions that, responsive to execution by a processor, implement an AVL tree manager to:
cause one or more records to be accessed as part of a search performed to update an Adelson-Velskii and Landis' (AVL) tree, the records stored in a memory, each of the records representing a node of the AVL tree;
cause the one or more records that are accessed during the search to be read from the memory;
cause the one or more records that are read from the memory to be written to a hardware-implemented AVL tree rebalancing component;
cause the hardware-implemented AVL tree rebalancing component to modify, based on rules for balancing AVL trees and without accessing the memory, the one or more records that correspond to the nodes of the AVL tree affected by the update of the AVL tree; and
after the hardware-implemented AVL tree rebalancing component modifies the records that correspond to the nodes of the AVL tree affected by the update, cause the modified records to be written to the memory effective to update the AVL tree.

16. The one or more computer-readable memory devices of claim 15, wherein the update of the AVL tree involves one of inserting one or more additional nodes into the AVL tree or removing at least one of the nodes of the AVL tree.

17. The one or more computer-readable memory devices of claim 16, wherein the AVL tree manager is further configured to cause one or more additional records corresponding to the one or more additional nodes to be written to the memory effective to insert the one or more additional nodes into the AVL tree.

18. The one or more computer-readable memory devices of claim 16, wherein the AVL tree manager is further configured to cause at least one of the records corresponding to the at least one node to be deleted from the memory effective to remove the at least one node from the AVL tree.

19. The one or more computer-readable memory devices of claim 15, wherein the hardware-implemented AVL tree rebalancing component is further configured to modify the records that correspond to the nodes of the AVL tree that are affected by the update of the AVL tree in parallel, one said record to another.

20. The one or more computer-readable memory devices of claim 15, wherein the AVL tree manager is further configured to search the records representing the nodes of the AVL tree according to an AVL tree search technique to locate a particular said record.

\* \* \* \* \*